(12) United States Patent
Loiselet (10) Patent No.: US 6,508,164 B1
(45) Date of Patent: Jan. 21, 2003

(54) FERMENTING MIXING KNEADERS

(75) Inventor: Michel Loiselet, La Grand Combe (FR)

(73) Assignee: Lambert Equipements, Bourg de Peage (FR)

( * ) Notice: Subject to any disclaimer, the term of this patent is extended or adjusted under 35 U.S.C. 154(b) by 0 days.

(21) Appl. No.: 09/914,069

(22) PCT Filed: Mar. 1, 2000

(86) PCT No.: PCT/FR00/00515

§ 371 (c)(1),
(2), (4) Date: Sep. 27, 2001

(87) PCT Pub. No.: WO00/51438

PCT Pub. Date: Sep. 8, 2000

(30) Foreign Application Priority Data

Mar. 1, 1999 (FR) .............................. 99 02721

(51) Int. Cl.⁷ ..................... A47J 43/044; A47J 43/08; A21C 1/00; A21C 1/02; B01F 7/16
(52) U.S. Cl. ............... 99/327; 99/331; 99/342; 99/348; 99/468; 99/470; 366/145; 366/146; 366/601
(58) Field of Search .................. 99/325–328, 331–335, 99/348, 645, 467, 342, 468, 470, 483, 484, 486, 352–355; 366/69, 206, 96–98, 207, 144–146, 149, 197, 314, 203, 601, 347, 349, 279; 426/504, 512, 523; 219/400, 492, 497

(56) References Cited

U.S. PATENT DOCUMENTS

| 4,294,166 A | * | 10/1981 | Takeuchi ............... 99/348 |
| 5,628,240 A | * | 5/1997 | Yoshida ............... 99/326 |
| 5,934,177 A | * | 8/1999 | Takeda et al. ........... 99/327 |
| 6,053,096 A | * | 4/2000 | Kakimoto et al. ........ 99/348 |

FOREIGN PATENT DOCUMENTS

| EP | 0 240 842 A1 | 10/1987 |
| FR | 2 676 619 A1 | 11/1992 |
| FR | 2 707 525 | 1/1995 |
| FR | 2 710 551 | 4/1995 |
| FR | 2 716 337 A1 | 8/1995 |
| FR | 2 740 234 | 4/1997 |
| JP | A 4-59033 | 2/1992 |

* cited by examiner

Primary Examiner—Timothy F. Simone
(74) Attorney, Agent, or Firm—Oliff & Berridge, PLC (57) ABSTRACT

The invention relates to a mixing kneader for kneading and providing thermal regulation of pasty products. The kneader includes a vessel, temperature regulators for selectively cooling and heating the vessel, a rotating tool for agitating products in the vessel and for exchanging heat with the products, a non-rotating tool for diffusing gas to the products and a controller with display. The invention enables precise regulation of temperature of the products in a scalable production process. In one instance, the invention may be extended to function as a sourdough fermenter for the production and preservation of sourdough.

22 Claims, 6 Drawing Sheets

FERMENTING MIXING KNEADERS

BACKGROUND OF THE INVENTION

1. Field of Invention

The present invention relates mainly to horizontal and vertical fermenting mixing kneaders, with rotating tool and nonrotating tool, with nonrotating vessel and with tilting or with raisable head, capable of being equipped with cooling/heating, for example by Peltier modules, with a suitable programmer for the manufacture and preservation of sourdough, and, more particularly, to mixing kneaders, with nonrotating or rotating vessel, with setting/programming of the instantaneous mechanical kneading energy.

2. Description of Related Art

In fermenting mixing kneaders, with rotating tool/nonrotating tool, no tilting system is provided; and, on other horizontal kneaders, emptying by tilting is generally ensured by means of an electric jack or costly hydraulics.

The two static-shaft/rotating-sleeve combinations are held by themselves, thus making it necessary, in this initial configuration, to have costly rolling bearings with large diameters, as described in French patent number 93/11754 of Sep. 27, 1993, published under number 2710551.

In the abovementioned patent, due to the initial location of the thermometric probe when the latter is arranged in the nonrotating tool, it is not possible to log measurements on medium and small dough quantities, but only on complete batches.

In general, the transmissions of heat and cold are diffused to the product in preparation via the walls of the vessel and the renewal of the dough stream as a result of the action of the blending/kneading/mixing/beating tools; if appropriate, by means of the nonrotating tool, but without the use of the rotating tool which may be hollow and serve as an additional exchanger.

In fermenting mixing kneaders with a horizontal and vertical nonrotating vessel, such as are described in the abovementioned patent, the oxygenation of the stream of the mass of product has a great influence on the results on account of the rotation, configuration and speed of the tools. It is already assisted, in the case, for example, of a rotating tool/nonrotating tool, by the effect of stretching/blowing of the dough, surprisingly mechanically reproducing ancestral human movements in a horizontal configuration, but without the use of the nonrotating tool which may be hollow and serve for injecting thermostatically controlled gaseous products into the product in the vessel.

The difference between a dough kneader and a dough fermenter, these two types of appliance having a configuration with identical tools and an identical vessel, is based essentially on the fact that the fermenter, having fragile dough, requires programmable and settable temperature regulation, with a very slow tool rotation, functioning in complex cycles, over very long periods of time, with less transmission power, and with beneficial gas exchanges which are difficult to obtain by means of a slow tool movement; the generation of cold and heat on the bottom of the vessel is carried out from one or two very bulky thermal systems, whereas, on refrigerated choppers, there is a particularly compact system which generates cold.

On fermenting mixing kneaders, with horizontal or vertical nonrotating vessel, in a vertical configuration, power-assisted raising of the head assembly is desirable, as described, for example, in French patent number 93/08198 of Jul. 13, 1993 published under number 2707525, but it is expedient to place, for example, an open-ended sequencing programmer on the head, in addition to the utility intakes, sensors, an access trapdoor to the vessel and a lighting system. Only liquid-sourdough fermenters are known in the prior art, and solely in vertical form; however, they present hygiene problems and change the ancestral manual customs in the manufacture of sourdough from dough and from a parent stock carefully kept cold, with regeneration by means of dough during its use. Moreover, a simplified and expedient programming is conceivable.

On fermenting mixing kneaders with a nonrotating and rotating vessel, during the kneading of breadmaking doughs and, more particularly of delicate sourdoughs, it is necessary to avoid the tearing of the fibers of the dough. Consequently, sourdough kneaders and fermenters with counterrotating tool movements, as described in European patent number 87104397.2 of Mar. 25, 1987, published under the number 0240842, and French patent number 94/02618 of Feb. 24, 1994, published under number 2716337, have effects on the aromas in the preparation of doughs, in spite of their high kneading speed. It is preferable to use, as a basis, kneaders, as described in the abovementioned French patent number 93/11754 of Sep. 27, 1993, only one tool of which is rotating, in order to benefit from neutral kneading, without tearing at a speed adapted according to the variable consistency of the doughs. Moreover, it is known that the control of the total kneading energy is also of major importance in terms of the value and constancy. of the results, in order to avoid "under-kneading" or "over-kneading", as described in French patent application number 95/12451 of Oct. 23, 1995, published under number 2740234. The instantaneous kneading energy applied to the dough by the tool has a very important influence on the aromas, hence the usefulness of the variable-speed transmission on high-performance kneaders; however, the consistency of the dough is found to change according to the phases, the temperatures and many other parameters, moreover along with intermittent stresses, depending on the location of the branches of the rotating tool in relation, on the one hand, to the wall of the vessel and on the other hand, to the branch of the tool nonrotating with the dough stream in formation. Several measuring systems may be used, such as: measurement of the current intensity, a sensor in the rotating tool or a strain gauge with a lever arm on a floating transmission, but the most expedient is the device for converting the mechanical energies into thermal energies, as described in the abovementioned French patent application number 95/12451 of Oct. 23, 1995, by measuring the temperature differential of the dough, since only this system is insensitive to the variable quantities of dough, to the kneaders and to the speed.

On fermenting mixing kneaders with a rotating vessel, with a rotating tool working only in part of the vessel, the detector of the safety screen acts, for example, as soon as raising by tilting takes place, by stopping the machine, but a space of the order of one hundred and forty millimeters is accepted for feeling the dough. Safety is therefore far from being absolute, and effective additional protection is conceivable.

SUMMARY OF THE INVENTION

The present invention, applied to horizontal fermenting kneaders, with rotating tool and nonrotating tool, has as its subject:

an assembly of power-assisted tilting devices with locking of positions of the vessel;

a specific device for holding by articulation, ensuring the functioning of the rotating tool/nonrotating tool combination, while allowing the tilting of the vessel;

a special arrangement of the thermometric probe;

a device for heat exchanges by means of a heat transfer fluid circulating in the rotating tool.

The present invention relating to fermenting mixing kneaders, with nonrotating and rotating vessel, has as its subject:

a device for the injection of thermostatically controlled gaseous products into the dough mass in the vessel by means of a nonrotating tool;

a specific cooling and heating system;

a device for the manufacture and preservation of sourdough, with multiple items of equipment, for example on the raisable head.

The present invention relating to fermenting mixing kneaders, with nonrotating and rotating vessel has as its subject a device for the measurement and setting of the instantaneous kneading energy in repetitive time cycles by the regulation of the variable-speed drive of the transmission assembly associated with the tool or, if appropriate, that of the vessel.

The present invention relating to fermenting mixing kneaders, with rotating vessel and with rotating tool, working only in part of the volume of the vessel, has as its subsidiary subject an optical safety sensor complementary to that of the screen.

To achieve the object of the invention, in horizontal fermenting mixing kneaders, a first device according to the invention resides in that the tilting of the vessel takes place by means of commercially available gas or fluid jacks, one of which is equipped with an integrated valve, capable of being controlled by a lever and thus allowing setting/locking in different positions without jolts, in order to make progressive emptying of the vessel possible, and, at the professional's choice, for his working comfort. The combination of a plurality of gas jacks is preferable, with different and variable forces, depending on the jack, and also the location of their rod, as a function of the tilting position of the vessel and of its load which are variable.

A second device according to the invention resides in that, by virtue of articulation, the holding of the easily demountable structure: nonrotating shaft/rotating sleeve/vessel pivot, is ensured by means of the frame, with a bearing carrier supporting the assembly. This design makes it possible for the rotations/tiltings to be possible and be ensured by means of rings/thrust bearings made of self-lubricating materials, with rolling bearings and seals having reasonable diameters. A reverse device may also be envisaged, with the bearing carrier fastened to the vessel and a pivot to the frame, still ensuring the free tilting of the vessel.

A third device according to the invention involves placing the thermometric probe in the low part of the nonrotating tool, so as to pass through the hollow static shaft supporting this tool via an orifice, in a suitable way.

A fourth device according to the invention involves using the hollow rotating kneading tool as an additional heat exchanger, with an intake and an outlet in one of the rotating sleeves of one of the articulations, in order to cause a heat transfer fluid to circulate via an intake and an outlet on another nonrotating sleeve fastened, for example, to the frame, with seals located between the rotating and nonrotating sleeves and taking the form of grooves produced by means of high-quality, for example, composite gaskets functioning as rolling bearings and resistant to very high temperatures.

In fermenting mixing kneaders with a horizontal or vertical nonrotating vessel, a fifth device according to the invention involves using the hollow nonrotating tool as a conduit for thermostatically controlled liquid or gaseous product, in order to make it possible to continuously or intermittently inject or atomize, by means of a nozzle equipped with a leaktight nonreturn and distribution valve, a liquid or a gaseous product, for example based on oxygen, at a very low adjustable pressure, into the product in preparation, in order to assist the regenerating gas exchange.

A sixth device according to the invention involves using Peltier-effect modules of very small overall size in order to generate cold and heat, for example indirectly on the double casing of the vessel, by means of a circulating heat transfer fluid, or, directly, on the bottom of a commercially available high-capacity pot, as standard, with a diffusing bottom or a three-material bottom, for perfect diffusion/distribution on the bottom and walls of the vessel, to the renewed stream of pasty product in preparation. As regards the Pettier-effect modules, depending on their electrical connection and their faces, they generate cold and heat on the perfectly machined bottom or plane wall to which they are fastened, preferably with a ventilation designed to discharge the useless opposing heat via the unused faces of these modules.

A seventh device according to the invention involves substituting for the liquid-sourdough fermenters a pasty-sourdough fermenting kneader which presents fewer hygiene problems and makes it possible to cause movement mechanically, while at the same time remaining close to the ancestral manual working customs. On these vertical and horizontal fermenting kneaders, in addition to the fifth and sixth devices mentioned above, it is expedient to provide on the head of the appliance and on the walls of the vessel, at suitable locations, the intakes for gaseous and liquid substances, the sensors, such as temperature, pH and liquidity sensors, with a lighting system, and a trapdoor for access to the vessel, during operations, without having to raise the head assembly. In order to simplify the functioning of the cycles of the pasty-sourdough fermenting kneader, in the fermenting position, there is provision for the slow rotation of the tool, associated with long periods of time, to a maximum of forty-eight hours, to be triggered by the function of the thermal device, hence the usefulness in accurately setting the ranges of the temperatures which will trigger more or less frequently the functioning of the thermal system, under cold or hot conditions, with respect to a programming of the temperature of the pasty sourdough, according to the phases: manufacture, holding and making available. To be precise, especially in the heat exchanges between the walls of the vessel and a dough, it is essential to have a homogeneous dough temperature and that the stream of dough be continuously renewed on the walls, with the knowledge that, in biotechnology, controlled temperatures and gas exchanges are the keys to optimum results. As an example, the programmer may be a commercially available digital transmitter/sequencer/regulator with microprocessor, which performs a plurality of programming/regulating functions and is equipped with a plurality of measurement displays. For example:

In the manufacturing phase: time and temperature/display are programmed.

In the holding phase: time and temperature/display are programmed.

In the use phase: time and temperature/display are programmed.

The thresholds of the temperature range are set.

The diffusion of the gaseous product is set.

The kneader/fermenter switch is tipped to the fermenting position.

Fermentation is started, and the change in the temperatures of the pasty sourdough in the vessel can be followed, this change triggering the cycles.

It is also possible, after laboratory tests, to establish the ideal temperatures in phases and, with the aid of a suitable automatic programmable unit, to retain only the programming of the times in phases, for the users, for the purpose of extreme simplification.

On fermenting mixing kneaders with a nonrotating and rotating vessel, an eighth device according to the invention involves having the possibility of selecting the type of kneading and maintaining a constant working energy, in repetitive time cycles, and, for example, of temperature measurements, whatever the consistencies, phases, types of kneader, Boughs and the quantity of these to be treated, by sequencer or automatic programmable unit acting on the regulation of the variable-speed drive. Depending on whether the programmed threshold is exceeded or not, in degrees or tenths of degree, for example, per minute, the device automatically regulates a reduction or an increase in the speed of the transmission or of some transmissions to the vessel and to the tool, in the desired proportions, to ensure a regularity of the optimum result. It is expedient to specify that, the more the speed of the tool is reduced, the more the kneading energy decreases, but that, in kneaders with a rotating vessel, it is possible to choose to act solely on the speed of the vessel, in the knowledge that, the more the speed is increased, the more the kneading energy is reduced. Moreover, it is necessary to equip the appliance with a functional programmer, for example with a commercially available digital indicator/transmitter/sequencer/regulator with microprocessor, which can make it possible to program the measurement threshold, its reading and its follow-up by display, and also the information per cycle, into the variable-speed drive, in order to change the speed according to range, for the purpose of maintaining the same kneading energy by means of cyclic corrections.

The programmer may be used as follows:

The temperature of the dough is displayed.

The measurement of the energy is programmed with display.

The speed range is set.

The kneader/fermenter switch is tipped into the kneader position.

Kneading is started, and the change in the temperature of the dough in preparation can be followed.

The programmer may be equipped, moreover, with a display of measurements of the total kneading energy and assume the various kneading and fermentation functions, all these programings and measurements being:

the temperatures, the speeds, the times.

However, it is necessary to know that a kneader requires programming over a maximum of thirty minutes, with a higher speed than the fermenter which itself requires programming time which may go up to a maximum of forty-eight hours. It is possible that the displays can ensure the two functions alternately, for example: the kneadings during the working time and the fermentations during the rest time, all the more because, on average, the baker carries out three or four kneadings per night and, for each kneader, the proportion of good dough does not exceed thirty percent of the mass in the vessel.

On fermenting mixing kneaders with a rotating vessel, with a rotating tool working only in part of the volume of the vessel, a ninth device according to the invention involves placing, for example, on the safety screen, generally capable of being turned down, and so as to leave a space for feeling the dough, an optical-curtain sensor capable of being illuminated and triggering stopping as soon as it is crossed. This optical sensor may be arranged in various ways, mainly on the screen or on the frame. It may consist of a beam, replacing a curtain depending on the types of kneaders and their capacity.

BRIEF DESCRIPTION OF THE DRAWINGS

The accompanying diagrammatic drawings illustrate the invention.

DETAILED DESCRIPTION OF PREFERRED EMBODIMENTS

Figure 1:
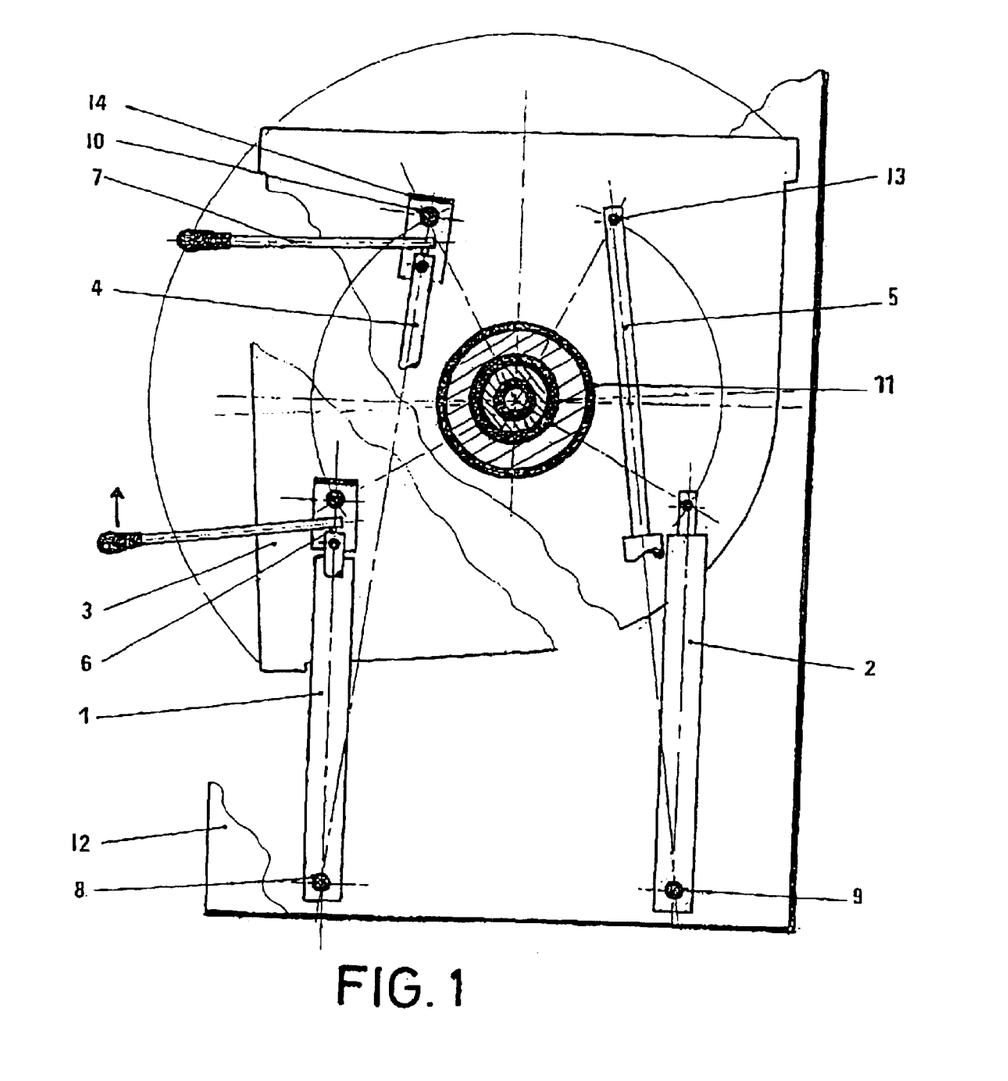
FIG. 1 shows the first device according to the invention, in profile, partially in section.

Referring to these drawings, the first device of the invention, shown in FIG. 1, comprises at least two gas or fluid jacks 1 and 2 which, in fact, are commercially available components; as an example, the first jack 1 is of a type often used on the seats of draftsmen, and the second jack 2 is of a type often placed on the tailgates/rear trunks of automobiles. These jacks 1 and 2 are arranged with opposing forces, for example, on each side of a bearing carrier 11 which encompasses the entire structure of each articulation of the vessel 3. These jacks 1 and 2 have different forces; they may have variable forces, with hard points, depending on the location of their respective rods 4 and 5. One of these jacks 1 is equipped with a valve 6, controlled by a solid lever 7. The feet and the rods of these jacks 1 and 2 are mounted in an oscillating manner by means of shafts mounted on self-lubricating rings 8 and 9 connected to the frame 12 and rings 10 and 13, with support piece 14 which are connected to the vessel 3.

Figure 2:
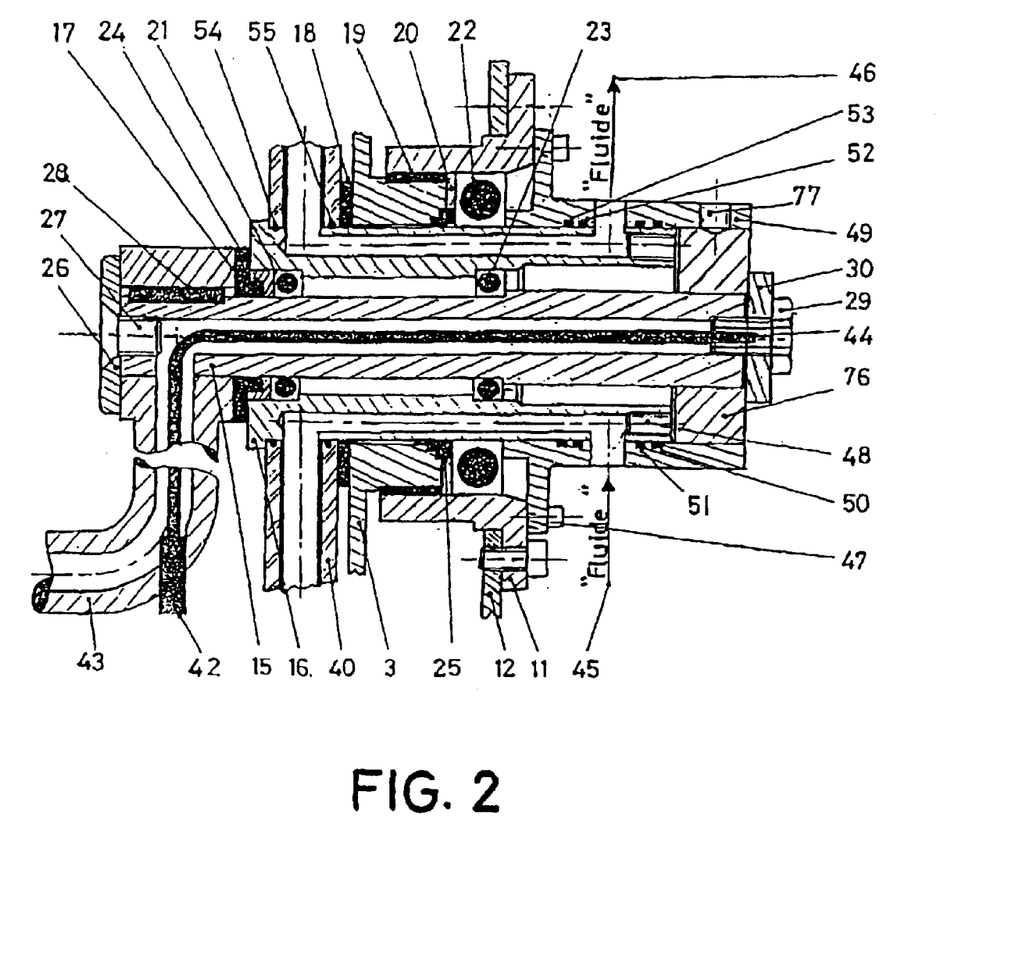
FIG. 2 shows a detail of the devices of the invention in section.
Figure 3:
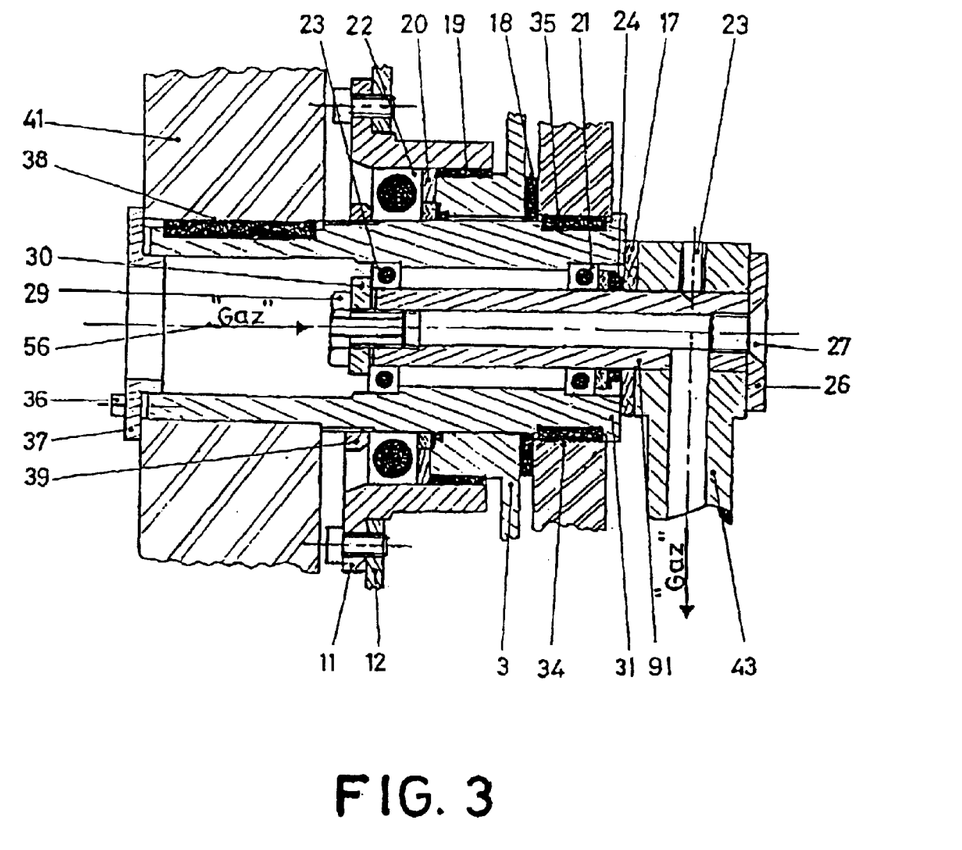
FIG. 3 shows additional devices of the invention in section.
Figure 6:
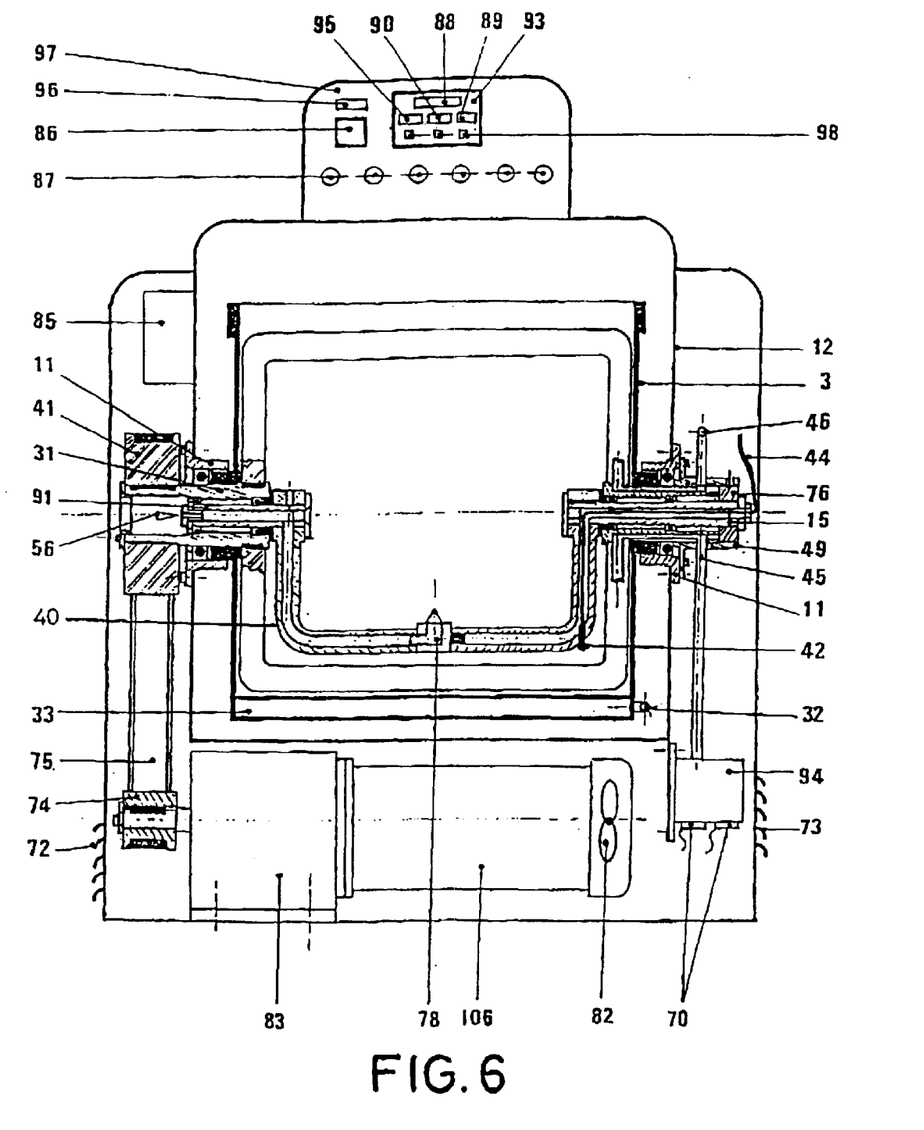
FIG. 6 shows, in section, the devices of the invention in yet another embodiment.

The second device of the invention, shown in FIGS. 2, 3 and 6, comprises for each articulation, with some variants according to the articulation, a bearing carrier 11, which is fastened to the frame 12. It includes a static shaft 15 or 91, a rotating sleeve 16 or 31, a pivot of the vessel 3, with rings and thrust bearings made of self-lubricating materials 17, 18, 19 and 20, rolling bearings 21, 22 and 23, sealing gaskets 24 and 25, washers, rings, clamping screws and cotter pins 26 to 39, a pulley 41, a hollow rotating tool 40 and a hollow nonrotating tool 43. The static shaft is locked, by virtue of its square end shape, in a ring 76, itself fastened in a nonrotating sleeve 49 by means of vent screws 77.

The third device according to the invention, shown in FIGS. 2 and 6, comprises, on one of the articulations, a thermometric probe 42 placed in the low part of the nonrotating tool 43, together with its sheathed flexible cable 44, by means of a suitable orifice, perpendicularly to the hollow static shaft 15.

The fourth device according to the invention, shown in FIGS. 2 and 6, comprises an inlet and outlet for heat transfer fluid 45 and 46, leaktight screws 48 and fastenings 47, a static sleeve 49 fastened on the bearing carrier 11, and composite gaskets made of self-lubricating materials 50 to 53 functioning as rolling bearings and with perfect sealing. The seals of the rotating tool 40 relative to the rotating sleeve 16 are obtained by means of gaskets 54 and 55. The hollow rotating tool 40 may consist either of a fabricated tubular structure or of a casting with insert, to allow the heat transfer fluid to circulate in the branches of this rotating tool 40, with an inlet and an outlet in the rotating sleeve 16 which itself ensures several functions: the passage of the heat transfer fluid via the nonrotating sleeve 49 and to the branches of the rotating tool 40, the holding of the rotating tool 40 and, by means of the rolling bearings 21 to 23, the holding of the static shaft 15 connecting the nonrotating tool 43. The heat transfer fluid may likewise circulate via a double casing on the vessel 3 and via a suitable inlet and outlet 32 on the leaktight double casing.

Figure 4:
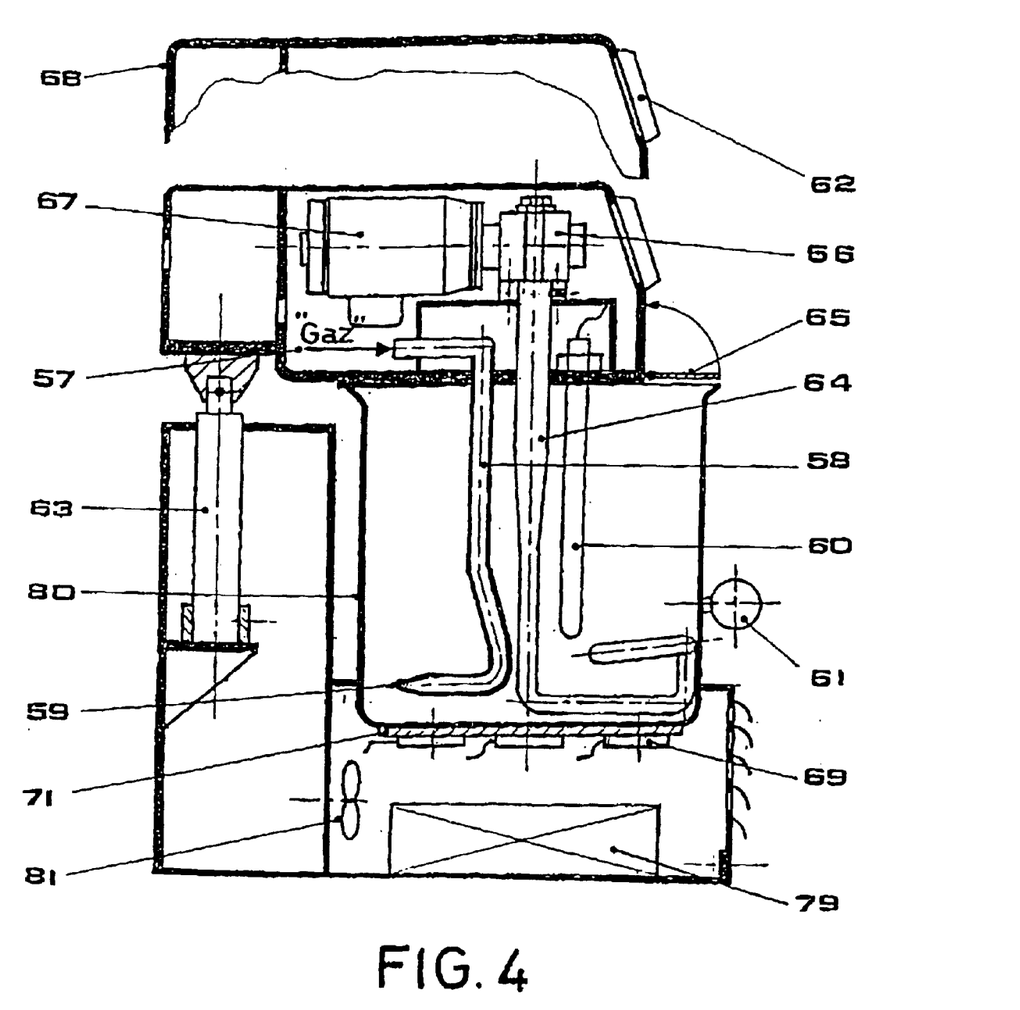
FIG. 4 shows, in section, the devices of the invention in another embodiment.

The fifth device according to the invention, shown in FIGS. 3, 4 and 6, comprises: an inlet and a conduit for thermostatically controlled gaseous or fluid product via the static shaft 91 and nonrotating hollow tools 43 and 58. These are equipped at their diffusion point 59 and 78, with a sealing nonreturn valve, with diffusion/atomizing nozzle, consisting of low-cost industrially available components.

The sixth device according to the invention, shown in FIGS. 2, 4 and 6, comprises Peltier-effect modules 69 and 70 which are fastened either directly to the vessel 80 or indirectly to a reservoir 94 for the distribution of heat transfer fluid, allowing cooling or heating of the distribution vessel 80 via the diffusing or three-material bottom 71, so that the walls of the vessel diffuse thermally to the renewed dough stream as a result of the combined action of the tools 64 and 68. In the other configuration, thermal diffusion takes place by the agency of a heat transfer fluid in the tool 40 by means of an inlet and outlet 45 and 46 respectively, and in the double casing of the vessel 3, with inlet and outlet 32, which are connected by means of flexible hoses to the circulation reservoir 34 which may be equipped with a small pump operating in closed circuit. The Peltier-effect modules supply heat and cold, depending on their faces and their electrical connection; it is expedient, for optimum functioning, to benefit from suitable ventilation 81 or 82 which, in the case of the horizontal kneader/fermenter, may be that of the motor 106. These modules are connected electrically to a programmer and operate alternately, generating cold or heat, depending on the program and the temperature of the dough in preparation, measured continuously in tens of degrees, in degrees and in tenths of a degree by the thermometric sensors 42 and 61.

The seventh device according to the invention as shown in FIGS. 1 and 6, comprises items of equipment which make it possible to work the pasty products either by kneading at high speeds over shorter periods of time or by fermenting at low speeds over very long periods of time. For this purpose, these sourdough fermenting kneaders can alternately combine these two additional functions, as a fermenter when the baker is resting or as a kneader during his working time. These fermenting kneaders are equipped either with an automatic programmable unit 79 and with displays or with a commercially available digital programmer/sequencer/display/transmitter/regulator assembly with microprocessor 93, connected to a specific control desk 62 or 97. This makes it possible, depending on the desks 62 and 97 and the sensors 42, 61 and 60, and in combination with the devices generating cold and heat 69 and 70, and the motorizations 67 and 106 and with the variable-speed drive 85, to obtain two additional functions on the same working tool:

1. Kneader function by switch, without the thermal device being used:

By setting the speed range at 86.

By following the change in speeds by means of a display 96.

By programming the instantaneous kneading energy by means of a display 95, corresponding to a rise in temperature in repetitive short time cycles.

By programming the total kneading energy by means of a display 89, corresponding to an increase in the temperature of the dough, triggering the stopping of the machine.

By following the change in temperature of the dough by means of a display 88.

2. Fermenter function by switch, and by the use of the thermal device 69 and 70:

By setting the temperature range triggering the work cycles during the phases.

By setting the slow kneading speed at 86

By having the possibility of following the set speed by means of the display 96

By programming the necessary time and temperature in the sourdough production phase by means of the display 95.

By programming the time and temperature or the sourdough holding cycle phase by means of the display 89.

By likewise programming the time and temperature of the sourdough availability cycle phase by means of a display 90.

By having the possibility of following the temperatures of the dough by means of the display 88.

By starting up the fermenter, which works automatically and regulates the temperature of the sourdough, until the desired result is obtained, this result being established by means of the successive programmings and the maintaining of the various changing temperatures of the sourdough which trigger the overall operating cycles, to be precise: in the vertical version shown in FIG. 4, starting up of the thermal device 69 causes the setting in rotation of the transmission assembly 67, 66 and 64 and if appropriate, the slight diffusion of thermostatically controlled gaseous product at 59; in the horizontal version, shown in FIG. 6, the starting up of the thermal device 70 causes the activation of the transmission assembly 106, 83, 74, 41, 31 and 40 and, if appropriate, the diffusion of moist gaseous product at 78. The stopping of the thermal assemblies as a function of the sourdough temperature programs, depending on the phases, and of the predetermined temperature difference range, likewise causes the stopping of all the devices, in particular of the transmissions.

The eighth device according to the invention shown in FIGS. 2 and 6, comprises a regulation of the speed by adjustable range and, on the basis of a programming, of the rise in temperature, in repetitive short time cycles, corresponding to a kneading energy; this energy being maintained by a reduction or increase in the speed of the tool, hence in the energy applied by its branches to the dough during the kneading phase. The consistency of the viscoelastic dough changes constantly; and, depending on whether the programmed temperature rise threshold is reached or not, the device regulates the variable-speed drive. For this purpose, the transmission assembly of the kneader consists of a motor 106, of a reduction unit 83, of a driving pulley 74, of a bolt 75, of a driven pulley 41, and of the rotating sleeve 31 ultimately driving the tool 40 in rotation. This assembly is controlled by means of a desk 97 and a digital programmer/ sequencer/display/transmitter/regulator with microprocessor 93, operating in repetitive short time cycles, measuring the temperatures of the dough by means of the sensor 42 and regulating the variable-speed drive 85. The principle of the functioning and adjustment of the kneading energy is simple. As an example, with the switch in the "kneader" position:

The speed modification range is set at 86.

The starting speed is set at 86.

A temperature rise, with display, is programmed at 95.

The kneader is started up.

The changes in the temperature of the dough and in the speeds of the tool can be followed by means of the various digital displays.

The advantage of the digital programmer/sequencer/ regulator/transmitter with microprocessor 93, which has several displays 88 to 90 and 95, according to its programming at 98, and being connected to the desk 97 and its controls 86 and 87, to the variablespeed drive 85 and 106 and to the heat exchanger system 70, is that this programmer can alternately ensure the kneader and fermenter functions, with full efficiency, in both configurations, the measurements being based essentially on the temperatures. In the fermenter mode, the optimum result is achieved by means of a start-up based on the functioning of the thermometric sensor 42, and, in the kneader mode, speed regulation, too, is based on the measurements of the thermometric sensor 42, still as a function of the programmings.

Figure 5:
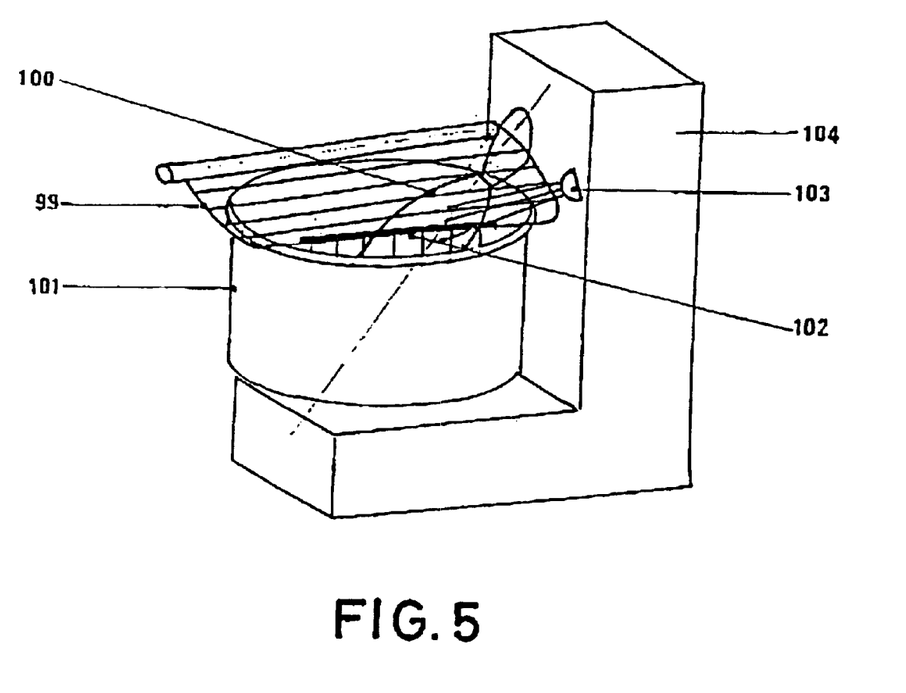
FIG. 5 shows an additional device according to the invention in perspective.

The ninth device according to the invention, shown in FIG. 5, comprises, on the kneaders with rotating vessel 101, on the opposite side to the rotating tool 100, either, placed on the safety screen 99, an illuminating curtain-type optical sensor 102 or, fastened to the frame 104, an optical beam sensor 103, for additional safety.

The devices according to the invention are intended particularly for the kneading/mixing of doughs and for the production/preservation of sourdough. In terms of applications, they are relevant:

in the horizontal version, to breadmaking kneaders and fermenting kneaders; fermenting mixing kneaders for all pasty products in industry and laboratories (with a capacity of seven to two thousand five hundred liters); heating mixing kneaders of very large capacity for the petrochemical industry (up to ten thousand liters).

In the vertical version, to sourdough fermenters and small-capacity cooking kneaders (up to a hundred liters) for the agricultural food sectors, laboratories and individuals.

In the version with a rotating vessel, to mixing kneaders of all types, in the sectors of breadmaking, industry and laboratories (with a capacity of six to six hundred liters).

What is claimed is:

1. A device for measuring and following the temperatures of dough for a mixing kneader, the device comprising:

a vessel, chosen from the group consisting of rotating vessel (80) and non-rotating vessel (3);

a tool, chosen from the group consisting of rotating tool (40, 64), non-rotating tool or tools (43, 58), rotating tool or tools (100) and mixtures thereof, wherein the tool operates in the vessel, the speed of the tool can be regulated during operation, heat and cooling can be applied to the vessel during operation, and further wherein movement of the tool can be selectively stopped;

thermometric (42), pH and humidity sensors;

at least one diffuser of gaseous product;

a heat exchanger;

at least one static shaft; and said device further characterized in that, on the basis of a mixing kneader equipped with one of a digital programmer/indicator/sequencer/transmitter/regulator with microprocessor (93), and an automatic programmable unit (79), either with displays (62, 88, 95, 89 and 90) enabling precise thermal regulation of the pasty products, its function as a mixing kneader is extended alternately a sourdough fermenter for the production and preservation of sourdough.

2. The device according to claim 1, characterized in that the triggering of the generation of cold or heat, depending on the programmings and the temperature of the sourdough, causes a starting up of the kneading tool (40, 64) in cycles, in order to obtain a homogenous distribution of the temperature in the renewed stream of the product on the walls and the bottom of the vessel (3, 80).

3. The device according to claim 1, characterized in that the regulation and generation of cold and heat, depending on the phase of the programme and the temperature of the pasty product in preparation, is ensured by means of Peltier-effect modules (69, 70).

4. The device according to claim 1, characterized in that, on the sourdough fermenting kneader, the programmer (93, 79), in the fermentation position, programs long cycles which may go up to 48 hours, associated with a slow rotational speed of the tool (40, 64), and, in the kneading mode, programs short cycles, over a maximum of 60 minutes, at higher tool speeds.

5. The device according to claim 3, characterized in that ventilation (81, 82) is provided for discharging the opposing heat generated by the unused faces of the Peltier-effect modules (69, 70).

6. The device according to claim 1, characterized by the use of pots, with a diffusing (71) or three-material bottom, for excellent thermal diffusion/distribution on the bottom and the walls with the renewed stream of the pasty product being treated.

7. The device according to claim 1, characterized in that, on a horizontal fermenting kneader with nonrotating (43) and rotating (40) tools, the thermometric probe (42) for measuring the temperatures of sourdough and pasty products is placed in the lower part of the nonrotating tool (43), a orifice allowing the passage of the flexible cable (44) of this probe (42) which, by virtue of its arrangement, makes it possible to pick up the temperatures of the small quantities of pasty products in the vessel.

8. The device according to claim 2, characterized by the use of pots, with either a diffusing (71) or three-material bottom, for excellent thermal diffusion/distribution on the bottom and the walls with the renewed stream of the pasty product being treated.

9. The device according to claim 1, characterized in that, on a horizontal fermenting kneader with nonrotating (43) and rotating (40) tools, the thermometric probe (42) for measuring the temperatures of sourdough and doughs is placed in the low part of the nonrotating tool (43), a suitable orifice allowing the passage of the flexible cable (44) of this probe (42) which, by virtue of its special arrangement, makes it possible to pick up the temperatures of the small quantities of dough in the vessel.

10. The device according to claim 1, characterized in that its kneading energy is selected, and in that a constant mechanical energy is maintained during the work of the tool on the dough of changing consistency, in time cycles, with elements for measuring the temperature of the dough which act on the setting of the variable-speed drive (85) by means of the digital programmer/sequencer/indicator/regulator with microprocessor (93) and of the automatic 10 programmable unit (79).

11. The device according to claim 9, characterized in that the digital programmer/indicator/sequencer/transmitter/regulator assembly with microprocessor (93) allows the programming of the measurement threshold, its reading and its follow-up by display, and also the information to the variable-speed drive (85) for a change in speed.

12. The device according to claim 1, characterized in that, on a horizontal fermenting kneader with rotating (40) and nonrotating (43) tools, the hollow rotating tool (40) serves, in addition, as a heat exchanger, in exactly the same way as the double casing (33) of the vessel (3), by means of the heat transfer fluid circulating, via inlets and outlets, on a structure comprising: a nonrotating sleeve (49) and a rotating sleeve (16), the seals (50 to 53) of which are ensured by means of self-lubricating composite gaskets resistant to very high temperatures.

13. The device according to claim 1, characterized in that the digital programmer/indicator/transmitter/sequencer/regulator with microprocessor (93) allows the programming of the measurement threshold, its reading and its follow-up by display, and also the information to the variable-speed drive (85) for a change in speed.

14. The device according to claim 1, characterized in that, on a horizontal fermenting kneader with rotating (40) and nonrotating (43) tools, the hollow rotating tool (40) serves, in addition, as a heat exchanger, in exactly the same way as the double casing (33) of the vessel (32), by means of the heat transfer fluid circulating, via inlets and outlets, on a structure comprising: a nonrotating sleeve (49) and a rotating sleeve (16), the seals (50 to 53) of which are ensured by means of self-lubricating composite gaskets resistant to very high temperatures.

15. The device according to claim 1, characterized in that the holding by articulation of the entire structure: nonrotating shaft (15, 91)/rotating shaft (16)/vessel pivot, is ensured by the frame (12) of the vessel (3) with a bearing carrier (11) holding the assembly.

16. The device according to claim 1, characterized in that, by articulation, the entire structure: bearing carrier (11), vessel pivot/rotating sleeve (16)/nonrotating shaft (15, 91)/rings and thruster bearings made of self-lubricating materials, rolling bearings and gaskets, allows the tilting of the vessel (3) on a fermenting kneader with rotating tool and nonrotating tool, the vessel being nonrotating.

17. The device according to claim 1, characterized in that, by means of an injection or atomizing nozzle equipped with a sealing non-return valve (78 and 59), the hollow nonrotating tool (43 and 58) diffuses a moist gaseous product or atomizes a thermostatically controlled liquid, at low adjustable pressure, into the mass of pasty products in preparation, the diffusion cycles of said tool being capable of being regulated on the basis of measurements of the humidity sensor or of the pH sensor.

18. The device according to claim 1, characterized in that, in the sourdough fermenter position, the temperature difference range, which simultaneously triggers the start-ups of the thermal device (69 and 70) and of the tool (40 and 64) is adjustable, in order to increase or reduce the number of cycles.

19. The device according to claim 3, characterized in that the Peltier-effect modules (69, 70) are placed either directly on the diffusing bottom (71) of the vessel (80) or indirectly on a diffusing reservoir (94) making it possible, with a suitable small pump, to cause a heat transfer fluid to circulate, on the one hand, in the double casing (33) of the vessel (3) and, on the other hand, in the rotating tool (40).

20. The device according to claim 1, characterized in that an optical curtain-type (102) or beam-type (103) safety sensor capable of being illuminating ensures the stopping of the kneader as soon as, for example, the hand crosses it in the vessel.

21. The device according to claim 1, characterized in that the Peltier-effect modules (69, 70) are placed either directly on the diff-using bottom (71) of the vessel (80) or indirectly on a diffusing reservoir (94) making it possible, with a suitable small pump, to cause a heat transfer fluid to circulate, on the one hand, in the double casing (33) of the vessel (3) and, on the other hand, in the rotating tool (40).

22. The device according to claim 1, characterized in that an optical curtain-type (102) or beam-type (103) safety sensor capable of being illuminating ensures the stopping of the kneader as soon as, for example, the hand crosses it in the vessel.

* * * * *